(12) United States Patent
Beranek et al.

(10) Patent No.: US 7,125,076 B2
(45) Date of Patent: Oct. 24, 2006

(54) AUTOMOTIVE MULTI-POSITION SEAT ASSEMBLY

(75) Inventors: John Beranek, Ann Arbor, MI (US); Dave Lechkun, Shelby Twp., MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/031,892

(22) Filed: Jan. 7, 2005

(65) Prior Publication Data
US 2006/0152049 A1 Jul. 13, 2006

(51) Int. Cl.
*B60N 2/02* (2006.01)
(52) U.S. Cl. .................... 297/283.3; 297/383
(58) Field of Classification Search ............ 297/92, 297/94, 283.3, 283.1, 383, 354.1, 452.18
See application file for complete search history.

(56) References Cited

U.S. PATENT DOCUMENTS

| | | | |
|---|---|---|---|
| 629,258 A * | 7/1899 | Johnston ............... 297/94 |
| 923,197 A * | 6/1909 | Murchison ............. 297/94 |
| 1,443,479 A * | 1/1923 | Lambert ................ 297/94 |
| 3,165,350 A | 1/1965 | Willson |
| 3,531,552 A * | 9/1970 | Getz et al. ............. 264/46.7 |
| 4,168,860 A * | 9/1979 | Garza et al. ............ 297/92 |
| 4,407,542 A | 10/1983 | Kehl et al. |
| 4,487,452 A | 12/1984 | Tanizaki et al. |
| 4,655,503 A | 4/1987 | Kamijo et al. |
| 4,685,719 A | 8/1987 | Hanemaayer |
| 4,779,917 A | 10/1988 | Campbell et al. |
| 4,792,188 A | 12/1988 | Kawashima |
| 5,000,505 A | 3/1991 | Kawashita et al. |
| 5,046,433 A | 9/1991 | Kramer et al. |
| 5,149,171 A | 9/1992 | Gilevich et al. |
| 5,197,774 A | 3/1993 | Diaz |
| 5,322,341 A | 6/1994 | Harrison et al. |
| 5,451,009 A | 9/1995 | Rumpf |
| 5,482,354 A | 1/1996 | Gryp |
| 5,524,962 A | 6/1996 | Fulgenzi et al. |
| 5,639,141 A | 6/1997 | Hanemaayer |
| 5,947,541 A | 9/1999 | Behrens et al. |
| 5,967,608 A | 10/1999 | Van Sickle |
| 6,000,742 A | 12/1999 | Schaefer et al. |
| D419,520 S | 1/2000 | Bergh |
| 6,065,798 A | 5/2000 | Sankrithi |
| 6,079,773 A | 6/2000 | Hassan |

(Continued)

FOREIGN PATENT DOCUMENTS

WO  WO 02/14103 A1  2/2002

OTHER PUBLICATIONS

Magna-Intier Seat, Jun. 8, 2004.

*Primary Examiner*—Milton Nelson, Jr.
(74) *Attorney, Agent, or Firm*—Gregory P. Brown; Brooks & Kushman, P.C.

(57) ABSTRACT

A seat assembly is disclosed for a passenger vehicle which provides multiple positions by translating a seat back between a fore position and an aft position relative to the seat bottom. A carriage is disclosed mounted to a track within a seat bottom for translating the seat back to the fore and aft positions. A motor and transmission are disclosed for driving the carriage. Additionally, a mechanism is disclosed for adjusting the tilt angle of the seat back as it is translated. A method for adjusting a seat assembly is provided.

19 Claims, 8 Drawing Sheets

U.S. PATENT DOCUMENTS

| | | |
|---|---|---|
| D430,534 S | 9/2000 | Golenz |
| 6,126,218 A | 10/2000 | Karhumaki |
| 6,129,404 A | 10/2000 | Mattarella et al. |
| 6,168,234 B1 | 1/2001 | Haynes et al. |
| 6,199,945 B1 | 3/2001 | Kim |
| 6,315,352 B1 | 11/2001 | Nomura |
| 6,402,246 B1 | 6/2002 | Mundell |
| 6,439,443 B1 | 8/2002 | Liao |
| 6,457,694 B1 | 10/2002 | Haynes et al. |
| 6,471,297 B1 | 10/2002 | Runde et al. |
| 6,474,739 B1 | 11/2002 | Lagerweij |
| 6,474,741 B1 | 11/2002 | Kamida et al. |
| 6,488,333 B1 | 12/2002 | Kim |
| 6,494,531 B1 | 12/2002 | Kim |
| 6,575,420 B1 | 6/2003 | Yoshida et al. |
| 2005/0253433 A1 | 11/2005 | Brown et al. |

* cited by examiner

AUTOMOTIVE MULTI-POSITION SEAT ASSEMBLY

BACKGROUND OF THE INVENTION

1. Field of the Invention

The present invention relates to automotive seat assemblies, more particularly to adjustable automotive seat assemblies.

2. Background Art

Automotive seating assemblies are continuously advancing. The market for motor vehicles, particularly passenger vehicles, has expressed an interest for passenger vehicles that optimize comfort, flexibility and features within a vehicle's interior.

In the advent of increased popularity of passenger/cargo vehicles such as SUVs or minivans, flexibility in seating, seating arrangements, seat adjustments and the like are well received by the consumer market. Accordingly, automotive manufacturers have incorporated various flexible features, such as collapsible seats, foldable seats, removable seats and the like so that the passenger may arrange the seats in a desired fashion.

Due to advances in modern electronics, many electronics that were conventionally associated with audio/video equipment for home or personal use, have eventually made their way into vehicle interiors. Such electronics include televisions, video game systems or the like.

Advances in electronic technology have permitted (utilization of exterior mounted cameras for receiving external images, which are subsequently displayed within the vehicle. Such displays assist, for example, in backing up, or driving in reverse, particularly in larger vehicles such as large sedans, SUVs, minivans, or the like.

In view of the foregoing, a flexible seat assembly is needed, that provides multiple seating positions. Also a method for adjusting a seat assembly to multiple positions is needed.

SUMMARY OF THE INVENTION

An aspect of the present invention is to provide a seat assembly for a passenger vehicle. The seat assembly has a seat bottom frame with a track mounted therein extending from a forward end to a rearward end. A carriage is mounted to the track for translation along the track. A motor and a transmission drive the carriage between a fore position and an aft position. A cushion is mounted to the seat bottom frame for receiving a passenger. A seat back is mounted to the carriage for translation with the carriage to the fore and aft positions thereby providing at least two seating positions upon the seat assembly.

Another aspect of the invention is to provide a seat assembly having a linear track mounted in a seat bottom frame. A carriage is mounted to the track for linear translation. A motor and transmission are mounted to the carriage for driving the carriage along the track between a fore position and an aft position. A seat bottom cushion is mounted to the seat bottom frame for receiving a passenger. A transverse shaft is mounted to the carriage and extends externally from the frame. The transverse shaft cooperates with either the carriage or frame so that as the carriage translates, the transverse shaft is rotated. A seat back is mounted to the transverse shaft for both translation along the track and for rotation between the fore and the aft positions.

Another aspect of the present invention is to provide a translatable seat back wherein a tilt orientation of the seat back is a function of a position of a carriage that translates within a seat bottom frame.

Yet another aspect of the present invention is wherein the seat back and seat bottom form an included angle that is obtuse in the aft position and another included angle in the fore position, which is also obtuse.

An aspect of the present invention is wherein the transmission adjusts a tilt position of the seat back as the seat back is translated.

A further aspect of the present invention is to provide a pair of limit switches on the seat bottom frame each oriented at one of the fore and aft positions to engage the carriage and indicate a limit in a range of travel of the carriage for discontinuing rotation of the motor.

Yet another aspect of the invention is wherein the track includes a pair of longitudinally extending guide shafts.

A further aspect of the invention is wherein the carriage includes a pair of linear slide bearings, each mounted to a guide shaft.

An additional aspect of the invention is wherein the motor and transmission are mounted to the carriage.

In one embodiment, a gear rack is provided longitudinally on the seat bottom frame, and a pinion gear is driven by the transmission and engaged with the gear rack for translation of the carriage.

A further aspect of the invention is to provide a seat back pivotally connected to a carriage in the seat bottom.

In one embodiment, a secondary transmission is provided in geared engagement with the seat back for adjusting a tilt position.

Another aspect provides a transverse shaft mounted to the carriage and extending from the seat bottom frame for receiving the seat back.

In one embodiment, a longitudinal cam track is mounted to a seat bottom frame and a cam follower is mounted to a transverse shaft of the seat back, in cooperation with the cam track such that as the seat back is translated, the cam follower adjusts a rotational orientation of the seat back.

A further aspect of the present invention is to provide a rotary bearing mounted on the carriage for receiving a transverse shaft of a seat back.

Another further aspect of the present invention is to provide a seat back with a pair of brackets extending to opposed lateral sides of the seat bottom frame, wherein each bracket is fixed to a distal end of a transverse shaft that mounts to a carriage within the seat bottom frame.

Yet another aspect of the present invention is to provide a seat assembly having a secondary transmission in geared engagement with the transverse shaft for adjusting a tilt position of the seat back.

An even further aspect of the invention is to provide a seat assembly having a gear mounted to the transverse shaft in geared engagement with and driven by the secondary transmission.

In one embodiment, the transverse shaft of the seat back includes a sector gear driven by the secondary transmission.

Another aspect of the invention is to provide a method for adjusting a seat assembly, by translating a seat back from an aft position wherein a passenger may sit on a seat bottom and face a first direction of the vehicle, to a fore position wherein the passenger may sit on the seat bottom and face a second direction. The method provides pivoting the seat back from a first tilt angle in the aft position to a second tilt angle in the fore position.

The above aspects, objects, embodiments, benefits and advantages are apparent in the attached figures and in the detailed description of embodiments of the invention below.

DETAILED DESCRIPTION OF EMBODIMENTS OF THE INVENTION

Figure 1:
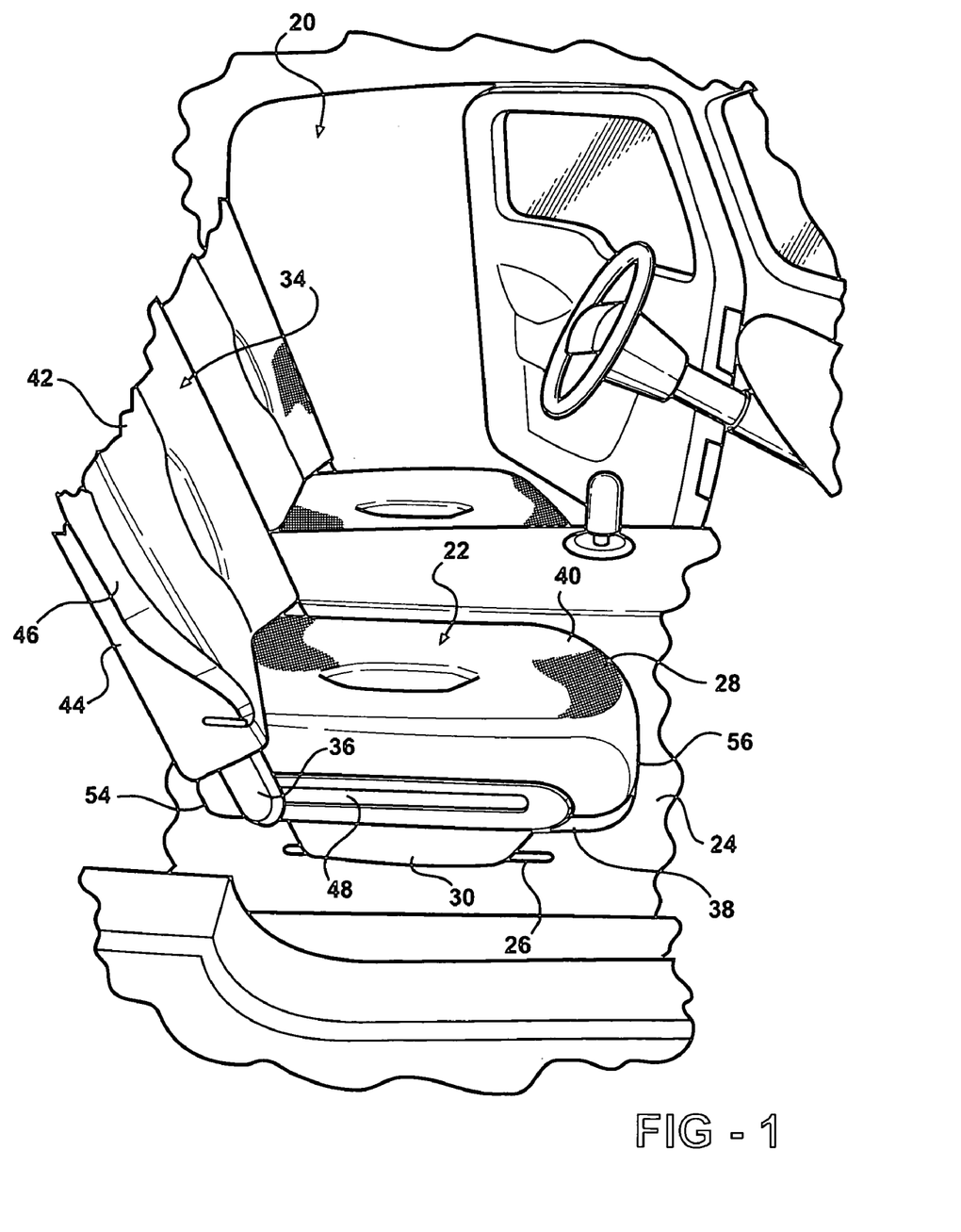
FIG. 1 is a passenger-side perspective view of an automotive interior, in accordance with the present invention, illustrating a seat assembly in a first position.

With reference now to FIG. 1, an automotive vehicle interior 20 is illustrated, specifically the interior of an SUV. The invention contemplates, however, any automotive interior within the spirit and scope of the present invention. The automotive interior 20 includes a first row of seat assemblies 22 each mounted to a vehicle floor 24. Each seat assembly 22 may be mounted to a track 26 in the vehicle floor 24 for longitudinal displacement of the seat assembly 22 relative to the vehicle.

Figure 2:
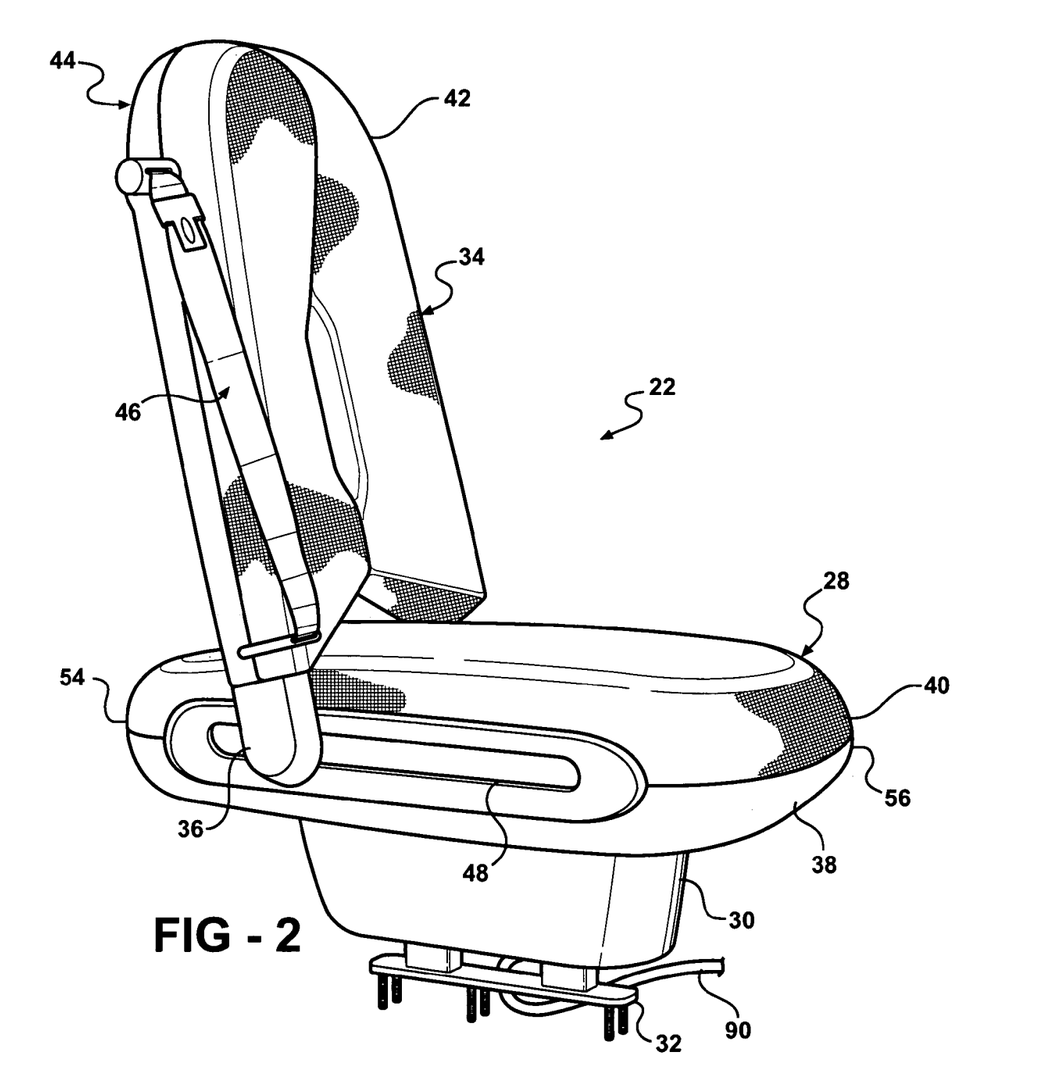
FIG. 2 is a perspective view of the seat assembly of FIG. 1, illustrated in the first position.
Figure 3:
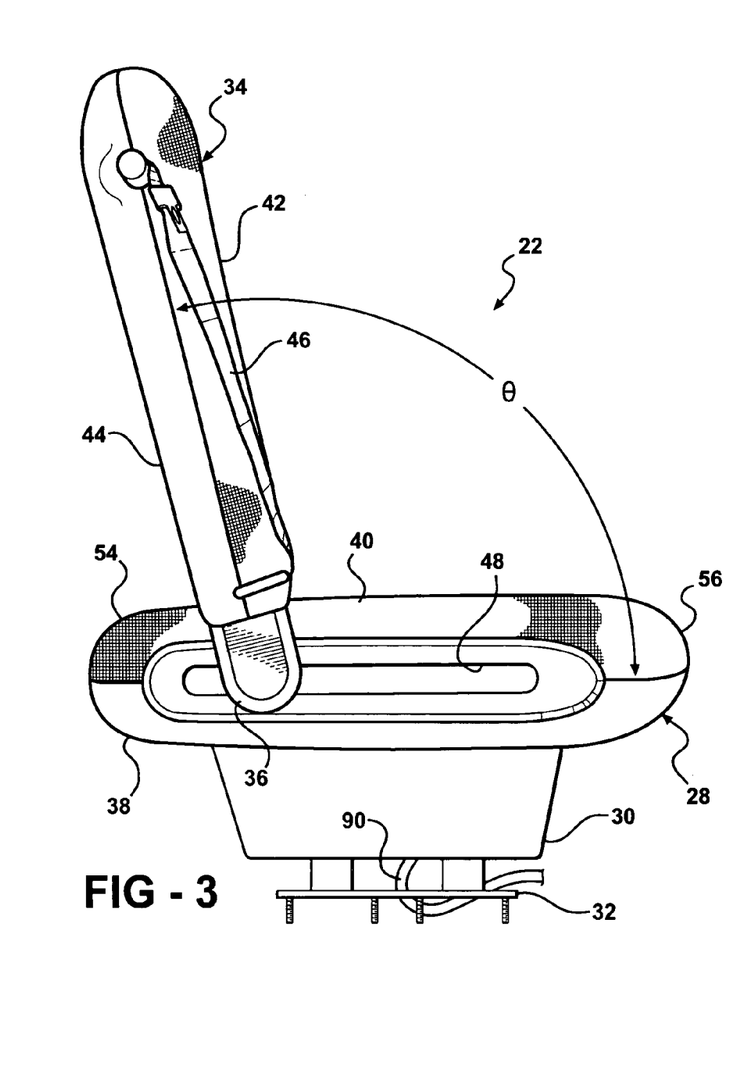
FIG. 3 is a side elevation view of the seat assembly of FIG. 1, illustrated in the first position.

Referring now to FIGS. 2 and 3, the seat assembly 22 is illustrated in a first seating position corresponding to that illustrated in FIG. 1, wherein the passenger faces a forward direction of the vehicle.

The seat assembly 22 includes a seat bottom 28. The seat bottom 28 is supported upon a riser 30 for spacing the seat bottom 28 from the vehicle floor 24. The seat assembly 22 also includes a mounting bracket 32 for mounting the seat assembly 22 to the vehicle floor 24. The mounting bracket 32 may cooperate with the track 26 for translating the seat assembly 22 relative to the automotive interior 20.

The seat assembly also includes a seat back 34 that is mounted to the seat bottom 28. The seat back 34 includes a pair of brackets 36, 36' that each extend to a lateral side of the seat bottom 28 for engagement therewith. The seat brackets 36, 36' support the seat back 34 relative to the seat bottom 28.

The seat bottom 28 includes a seat bottom frame 38 with a seat bottom cushion 40 provided thereupon. When the passenger sits on the seat assembly 22 in the forward facing direction of FIGS. 1–3, the user is seated upon the seat bottom cushion 40 and the passenger rests its back against the seat back 34. The seat back 34 is padded on a forward facing side 42 and a rearward facing side 44 for providing comfort and support to the passenger in multiple positions thereof. The seat back 34 also includes a seat belt assembly 46 for securing the passenger to the seat assembly 22 in the forward facing direction.

The seat bottom 28 includes a pair of slots 48, 48' formed through its lateral sides. The seat back 34 cooperates with a track provided within the seat bottom frame 38 through the slots 48, 48' formed in the sides of the seat bottom 28.

In the forward facing direction of the seat assembly 22, the seat back 34 is oriented at a rearward or aft position relative to the seat bottom 28 and is angled having a seat back tilt for comfortably supporting the passenger. The seat back tilt is generally provided at an included angle as an obtuse angle provided between the seat back 34 and the seat bottom 28. This included angle is illustrated by $\theta$ in FIG. 3.

Figure 4:
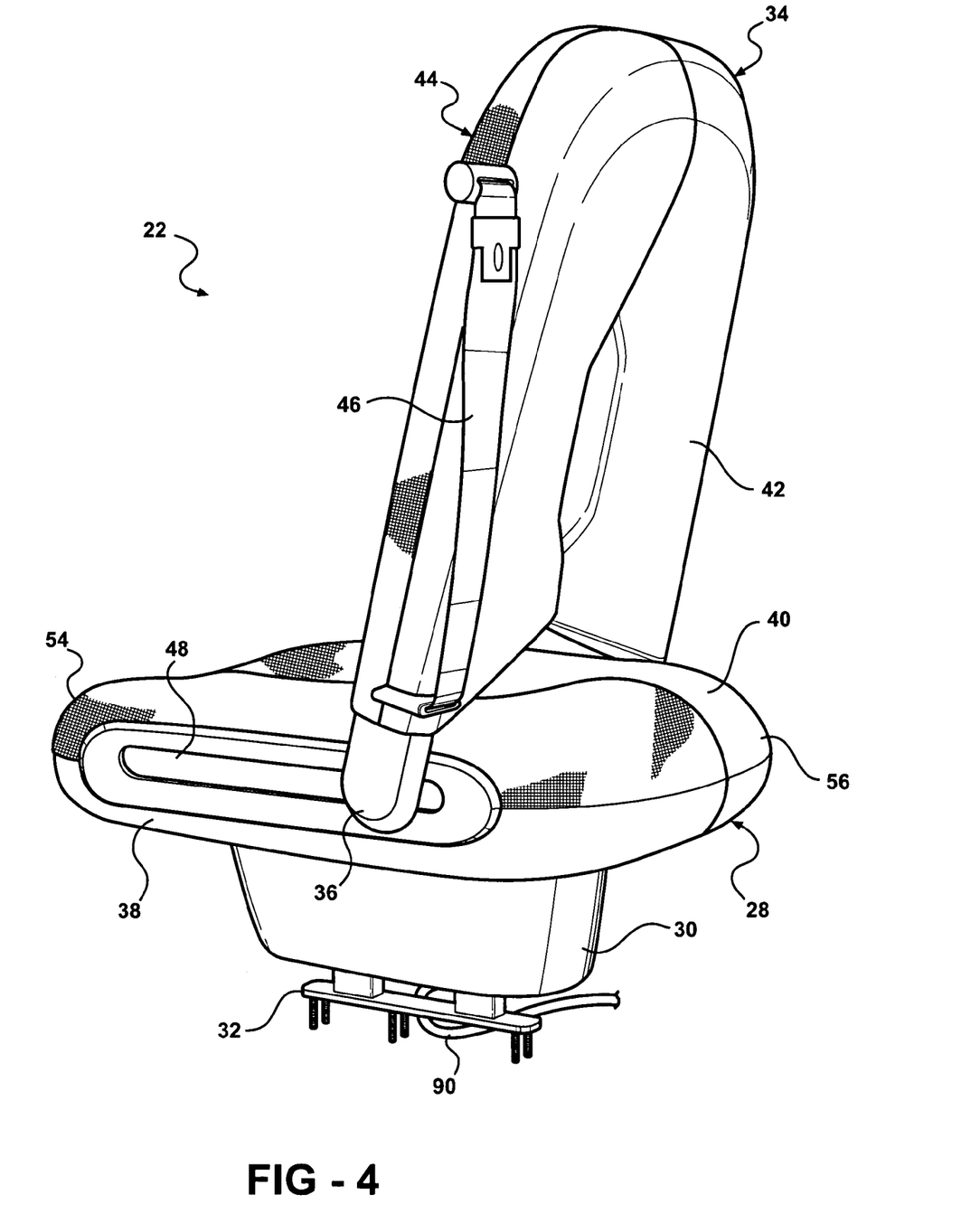
FIG. 4 is a side perspective view of the seat assembly of FIG. 1, illustrated in a second position.
Figure 5:
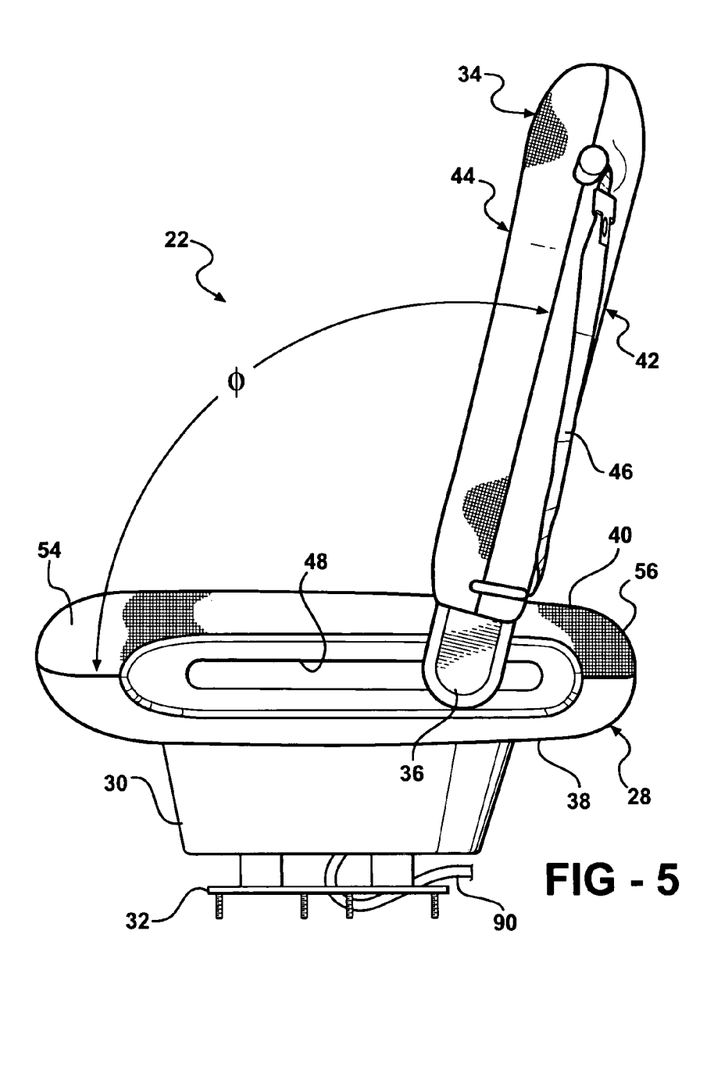
FIG. 5 is a side elevation view of the seat assembly of FIG. 1, illustrated in the second position.

Referring now to FIGS. 4 and 5, the seat back 34 has been translated to a forward position at a forward end of the seat bottom 28. At this orientation, the passenger may sit upon the seat bottom cushion 40 and face a rearward direction of the vehicle. The passenger may also rest its back against the cushioned rearward facing side 44 of the seat back 34. As illustrated in FIG. 5, when the seat back 34 has translated to the forward end of the seat bottom 28, the tilt of the seat back 34 is reversed thereby providing an included angle $\phi$ between the seat back 34 and the seat bottom 28 which is also inclined away from the seat bottom 28 forming an obtuse angle for comfortably receiving the passenger.

The rearward facing orientation of the seat assembly 22 in FIGS. 4 and 5 permits the passenger to sit on the seat assembly 22 and face the reverse direction, without having to rotate the seat assembly 22 or remove and reinstall the seat assembly 22. Such an orientation may be useful for communicating with others located in a second rearward seating row. Additionally, such a seating position may be effective for rearward viewing while traveling.

Figure 6:
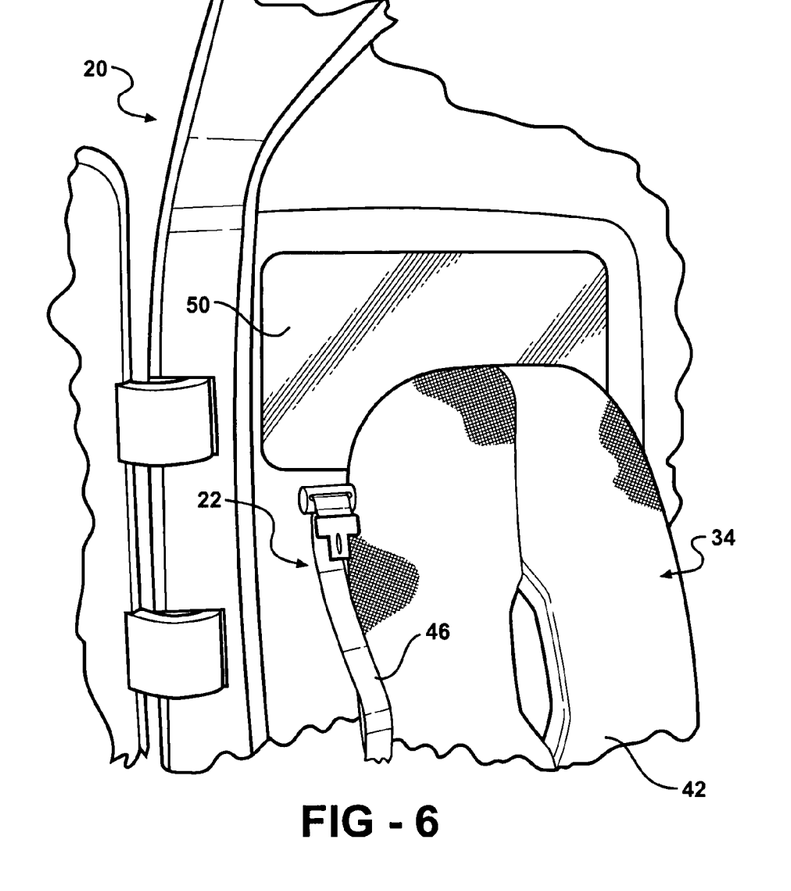
FIG. 6 is a front perspective view of the automotive interior of FIG. 1.

In one embodiment, as illustrated in FIG. 6, the automotive interior 20 may include a visual display such as a flat panel display 50 mounted upon a rearward door in the automotive interior 20. The flat panel display 50 may be provided in cooperation with a visual media input, such as a DVD player, television signals, computer displays, video game displays, or satellite television channels. Accordingly, a passenger may desire to face rearward and watch a broadcast provided on the flat panel display 50. The driver seat assembly 22 may also be capable of facing the rearward direction for viewing the flat panel display 50 when the vehicle is parked.

The vehicle may include an exterior camera for receiving an external image rearward of the vehicle, which may be displayed upon the flat panel display 50 during transportation of the vehicle. Such a display substitutes having a rear window for the driver to view an area rearward of the vehicle during travel.

Figure 7:
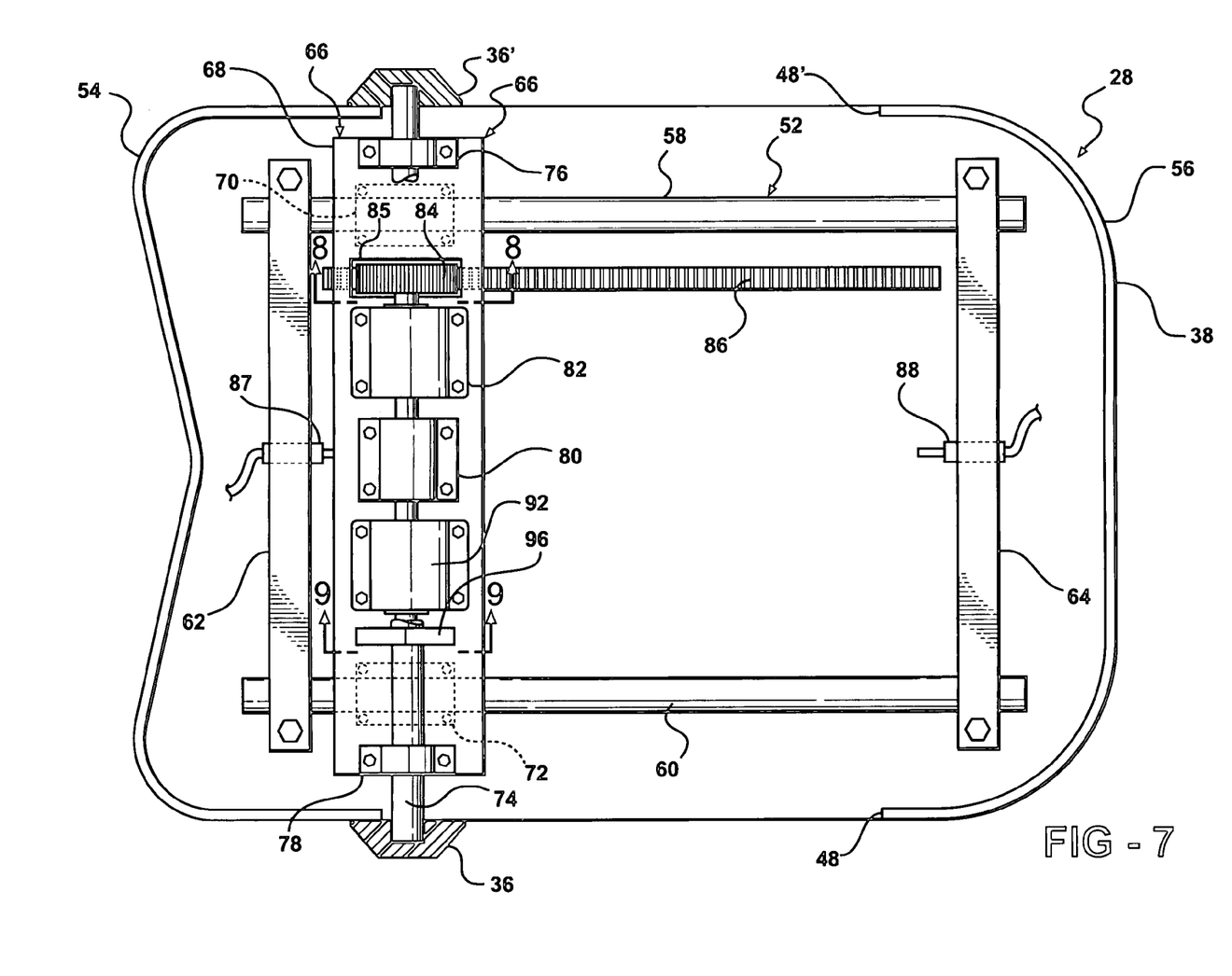
FIG. 7 is a fragmentary top plan view of the seat assembly of FIG. 1.

Referring now to FIG. 7, the seat bottom 28 is illustrated with the seat bottom cushion 40 removed, thus illustrating components mounted within the seat bottom frame 38. A linear track 52 is mounted to the seat bottom frame 38 and aligned longitudinally for translation of the seat back 34 between a rearward end 54 and a forward end 56 of the seat bottom 28. The track 52 includes a pair of linear guide shafts 58, 60 that are mounted to the seat bottom frame 38 by a pair of guide shaft mounting blocks 62, 64.

The carriage 66 is mounted to the track 52 for linear translation. The carriage 66 includes a carriage plate 68 with a pair of linear slide bearings 70, 72. The linear slide bearings 70, 72 are fastened to an underside of the carriage plate 68. Each slide bearing 70, 72 receives one of the guide shafts 58, 60 therethrough for providing bearing support to the carriage 66 as it translates along the guide shafts 58, 60.

The seat back brackets 36, 36' are mounted to distal ends of a transverse shaft 74, which extends through slots 48, 48' formed through the seat bottom 28. The transverse shaft 74 is mounted to the carriage plate 68 by a pair of rotary bearings 76, 78 for providing bearing support to the seat back 34 upon the carriage 66. The rotary bearings 76, 78 permit the seat back 34 to pivot relative to the seat bottom 28 as well. The transverse shaft 74 extends from one seat back bracket 36 to the other 36'. The transverse shaft 74 is illustrated partially fragmented in FIG. 7 to provide a view of the carriage 66 and its associated components displaced underneath the shaft 74. Of course, the invention contemplates a pair of transverse pivotal connections rather than the elongate transverse shaft 74.

The carriage 66 includes a motor 80 mounted to the carriage plate 68. The motor drives a gear box 82 for imparting a reduced rotation to an output pinion gear 84 which extends through aperture 85 in carriage plate 68. The motor 80 may be a DC motor and the gear box 82 reduces the rotation of the motor 80 to provide a steady and gradual translation of the carriage 66.

Figure 8:
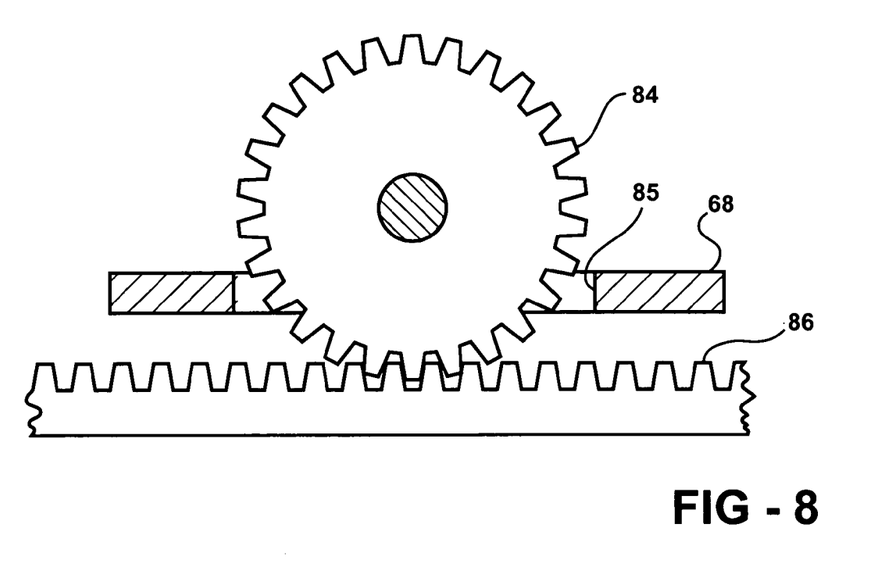
FIG. 8 is an enlarged section view taken along section line 8—8 in FIG. 7.

Referring now to FIGS. 7 and 8, the pinion gear 84 engages a gear rack 86 that is mounted to the seat bottom frame 38. Thus, the reduced rotation imparted to the pinion gear 84 drives the pinion gear 84 and consequently the carriage 66 along the rack 86.

Referring back to FIG. 7, although the motor 80 and gear box 82 are illustrated mounted to the carriage 66, the invention contemplates that the motor 80, gear box 82 and output could be mounted to the seat bottom frame 38, and the motor output could be utilized for engaging the carriage 66 and driving the carriage 66 along the track 52.

The motor 80 is utilized for driving the carriage 66 between the aft position as illustrated in FIG. 7, wherein the carriage 66 is mounted proximate to the seat bottom rearward end 54, and the fore position wherein the carriage 66 is translated proximate to the seat bottom forward end 38.

A pair of limit switches 87, 88 are provided mounted to the seat bottom frame 38. The limit switches 87, 88 are each mounted to one of the guide shaft blocks 62, 64 for engagement with the carriage 66 when it reaches either position in its range of translation. When the passenger desires to translate the seat back 34 from the aft position to the fore position, the passenger inputs a command within the vehicle interior 20 by, for example, pressing a button associated with the seat assembly 22. The input signal results in power imparted to the motor 80 which subsequently drives the gear box 82 and pinion gear 84 causing the carriage 66 to translate along the track 52. When the carriage 66 reaches the fore position, the carriage 66 engages the limit switch 88, which conveys a signal indicating that the carriage 66 has reached the fore position, and the power to the motor 80 is discontinued.

When the passenger inputs a signal to translate the carriage 66 from the fore position to the aft position, power is imparted to the motor 80 that generates a reverse rotation so that the carriage 66 translates in an opposite direction. Upon reaching the aft position, the limit switch 87 conveys a signal, which results in a termination of power imparted to the motor 80. The associated wiring for the motor 80 and limit switches 87, 88 is routed through a wire harness 90 that extends to the riser 30 as illustrated in FIGS. 2–5.

Although limit switches 87, 88 are illustrated and described, other position sensing devices may be employed within the spirit and scope of the present invention. For example, proximity sensors may be utilized for sensing the location of the carriage 66. A servo motor could be utilized for determining the position of the carriage 66. Alternatively, load sensors may be provided on the motor 80 for measuring an increased load imparted to the motor 80 characteristic of the carriage 66 reaching a limit in its travel.

The seat back 34 cooperates with the seat bottom 28 so that as the seat back is translated linearly, the tilt angle of the seat back is adjusted as well. For example, the motor 80 may have an output shaft extending from both ends for driving the first gear box 82 and a second gear box 92.

Figure 9:
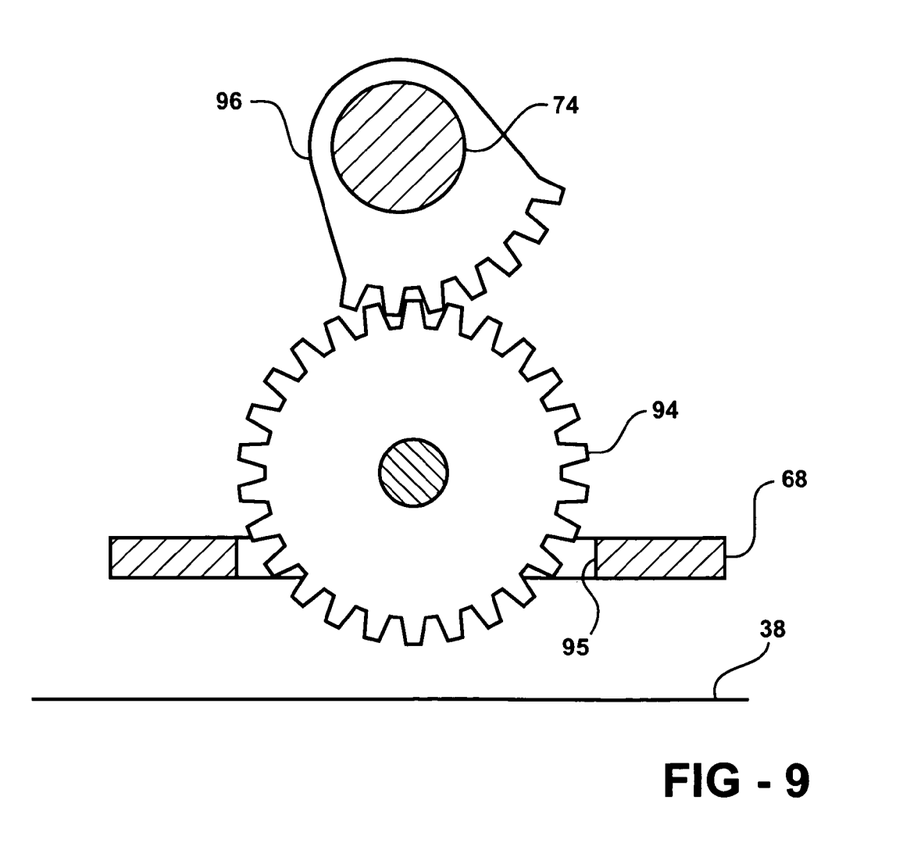
FIG. 9 is an enlarged section view taken along section line 9—9 in FIG. 7.

Referring now to FIGS. 7 and 9, the second gear box 92 drives an output pinion gear 94 which extends through aperture 95 in carriage plate 68. The second gear box 92 provides a reduced rotation that is reduced more than that provided by the first gear box 82. The pinion gear 94 is geared in engagement with a sector gear 96 that is mounted to the transverse shaft 74. Thus, as the motor 80 drives the carriage 66 along the track 52, the motor also drives the transverse shaft 74 for adjusting the tilt angle of the seat back 34. The output rotation of the second gear box 92 is reduced much greater than that of the first gear box 82 because only a partial rotation of the transverse shaft 74 is required.

Although a pair of gear boxes 82, 84 are illustrated on opposed output sides of the motor 80, the invention contemplates that the motor 80 may drive, in series, the first gear box 82, the pinion gear 84, and a subsequent reduction gear stage that drives the transverse shaft 74.

Figure 10:
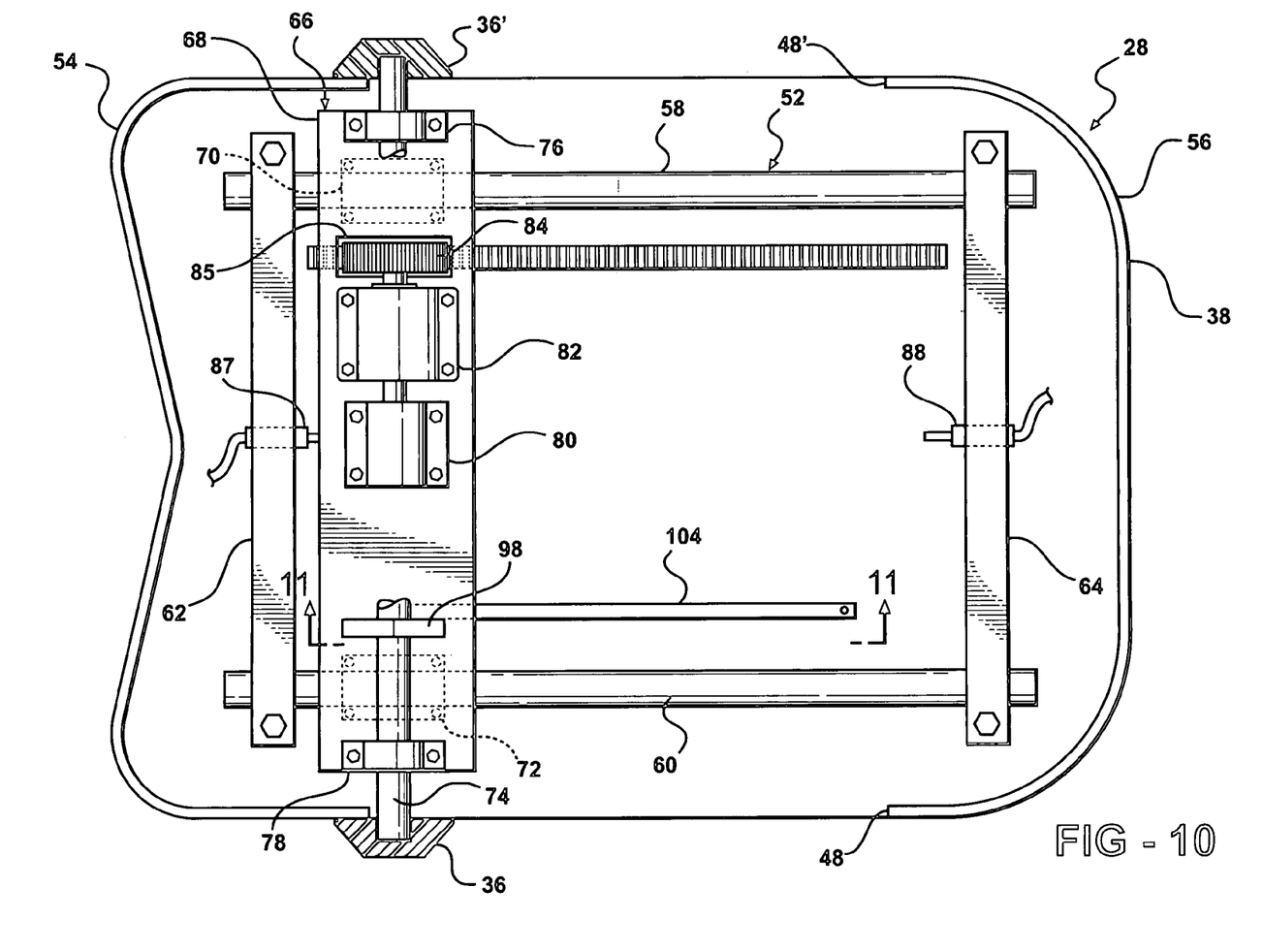
FIG. 10 is a fragmentary top plan view of an alternative embodiment seat assembly in accordance with the present invention.
Figure 11:
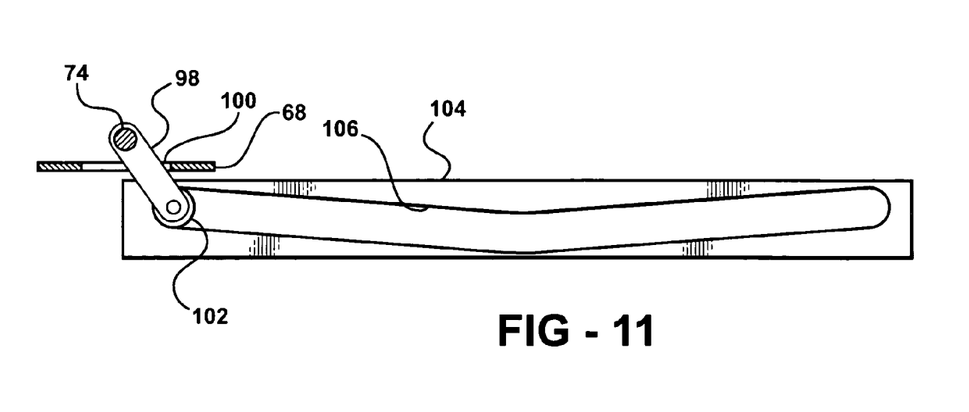
FIG. 11 is an enlarged section view taken along section line 11—11 in FIG. 10.

Alternatively, with reference to FIGS. 10 and 11, an alternative tilt adjust mechanism is illustrated for tilting the seat back 34. Rather than a second transmission, the transverse shaft 74 includes a cam follower 98 extending therefrom through an aperture 100 formed in the carriage plate 68. A cam follower bearing 102 is mounted to a distal end of the cam follower 98. A cam track 104 is mounted to the seat bottom frame 38. The bearing 102 is disposed within a cam groove 106 formed in the cam track 104. The cam groove 106 includes upward peaks proximate to the aft position and the fore position for rotating the transverse shaft 74 relative to the carriage 66 and providing the desired tilt for tilting the seat back 34.

Although the seat back tilt is a function of translation of the carriage 66, the invention contemplates that a second DC motor could be provided for permitting user desired tilt adjustment of the seat back 34 for obtaining various recline and upright positions.

In summary, a seat assembly is disclosed which provides a forward seating position and a rearward seating position by translating the seat back from an aft position to a fore position and pivoting the seat back to a corresponding tilt angle for each position. Thus, the passenger may be provided with multiple seating positions by a press of a button, without requiring manual actuation for rotating, collapsing, flipping or performing other manual tasks for utilizing a common seat assembly in multiple positions.

While embodiment of the invention have been described in detail, those familiar with the art to which this invention relates will recognize various alternative designs and embodiments for practicing the invention as defined by the following claims.

What is claimed is:

1. A seat assembly for a passenger vehicle comprising:
   a seat bottom frame adapted to be mounted to a floor of the passenger vehicle, the frame having a forward end and a rearward end;

a linear track mounted to the seat bottom frame extending generally from the forward end to the rearward end;

a carriage slidably mounted to the track for linear translation along the track;

a motor mounted to the carriage;

a transmission mounted to the carriage, operably driven by the motor and operably connected to the seat bottom frame for driving the carriage along the track to a fore position and an aft position;

a seat bottom cushion mounted to the seat bottom frame for receiving a passenger thereon;

a transverse shaft mounted to the carriage, extending external from the seat bottom frame, the transverse shaft being in operable engagement with one of the carriage or seat bottom frame so that the transverse shaft is rotated as the carriage translates; and a seat back mounted to the transverse shaft for linear translation and rotation from the aft position to the fore position for providing at least two seating positions upon the seating assembly.

2. A seat assembly for a passenger vehicle comprising:

a seat bottom frame adapted to be mounted to a floor of the passenger vehicle, the frame having a forward end and a rearward end;

a track mounted to the seat bottom frame extending generally from the forward end to the rearward end;

a carriage slidably mounted to the track for translation along the track;

a motor mounted to one of the seat bottom frame or the carriage;

a transmission driven by the motor and operably engaged to the other of the seat bottom frame or the carriage for driving the carriage along the track between a fore position and an aft position;

a seat bottom cushion mounted to the seat bottom frame for receiving a passenger thereon; and a seat back mounted to the carriage for translation with the carriage to the fore and aft positions for providing at least two seating positions upon the seat assembly;

wherein a tilt orientation of the seat back is adjusted as a function of carriage position.

3. The seat assembly of claim 2 wherein the motor and transmission are mounted to the carriage.

4. The seat assembly of claim 2 wherein the transmission is in operable communication with the seat back for adjusting the tilt orientation of the seat back as the seat back is translated.

5. The seat assembly of claim 2 wherein the track is further defined as a pair of longitudinally extending guide shafts.

6. The seat assembly of claim 5 wherein the carriage includes a pair of linear slide bearings each mounted to one of the guide shafts.

7. A seat assembly for a passenger vehicle comprising:

a seat bottom frame adapted to be mounted to a floor of the passenger vehicle, the frame having a forward end and a rearward end;

a track mounted to the seat bottom frame extending generally from the forward end to the rearward end;

a carriage slidably mounted to the track for translation along the track;

a motor mounted to one of the seat bottom frame or the carriage;

a transmission driven by the motor and operably engaged to the other of the seat bottom frame or the carriage for driving the carriage along the track between a fore position and an aft position;

a seat bottom cushion mounted to the seat bottom frame for receiving a passenger thereon; and a seat back mounted to the carriage for translation with the carriage to the fore and aft positions for providing at least two seating positions upon the seat assembly;

wherein an included angle between the seat back and the seat bottom is an obtuse angle in the aft position and an included angle between the seat back and the seat bottom is an obtuse angle in the fore position.

8. A seat assembly for a passenger vehicle comprising:

a seat bottom frame adapted to be mounted to a floor of the passenger vehicle, the frame having a forward end and a rearward end;

a track mounted to the seat bottom frame extending generally from the forward end to the rearward end;

a carriage slidably mounted to the track for translation along the track;

a motor mounted to one of the seat bottom frame or the carriage;

a transmission driven by the motor and operably engaged to the other of the seat bottom frame or the carriage for driving the carriage along the track between a fore position and an aft position;

a seat bottom cushion mounted to the seat bottom frame for receiving a passenger thereon; and a seat back mounted to the carriage for translation with the carriage to the fore and aft positions for providing at least two seating positions upon the seat assembly;

a first limit switch mounted to the seat bottom frame oriented so that the carriage engages the limit switch at the fore position and the limit switch conveys a signal indicating a limit in a range of linear travel of the carriage; and a second limit switch mounted to the seat bottom frame oriented so that the carriage engages the limit switch at the aft position and the limit switch conveys a signal indicating a limit in a range of linear travel of the carriage; and wherein the limit switch signals are utilized for discontinuing rotation of the motor.

9. A seat assembly for a passenger vehicle comprising:

a seat bottom frame adapted to be mounted to a floor of the passenger vehicle, the frame having a forward end and a rearward end;

a track mounted to the seat bottom frame extending generally from the forward end to the rearward end;

a carriage slidably mounted to the track for translation along the track;

a motor mounted to the carriage;

a transmission mounted to the carriage, being driven by the motor and operably engaged to the seat bottom frame for driving the carriage along the track between a fore position and an aft position;

a seat bottom cushion mounted to the seat bottom frame for receiving a passenger thereon;

a seat back mounted to the carriage for translation with the carriage to the fore and aft positions for providing at least two seating positions upon the seat assembly;

a longitudinal gear rack mounted on the seat bottom frame; and a pinion gear driven by the transmission in geared engagement with the rack so that the transmission imparts a reduced rotation to the pinion gear thereby driving the carriage along the track.

10. A seat assembly for a passenger vehicle comprising:
a seat bottom frame adapted to be mounted to a floor of the passenger vehicle, the frame having a forward end and a rearward end;
a track mounted to the seat bottom frame extending generally from the forward end to the rearward end;
a carriage slidably mounted to the track for translation along the track;
a motor mounted to one of the seat bottom frame or the carriage;
a transmission driven by the motor and operably engaged to the other of the seat bottom frame or the carriage for driving the carriage along the track between a fore position and an aft position;
a seat bottom cushion mounted to the seat bottom frame for receiving a passenger thereon; and
a seat back mounted to the carriage for translation with the carriage to the fore and aft positions for providing at least two seating positions upon the seat assembly;
wherein the seat back is pivotally connected to the carriage.

11. The seat assembly of claim 10 further comprising a secondary transmission in geared engagement with the seat back for adjusting a tilt position of the seat back.

12. The seat assembly of claim 10 further comprising a transverse shaft mounted to the carriage extending externally from the seat bottom frame wherein the seat back is mounted to the transverse shaft.

13. The seat assembly of claim 12 further comprising:
a longitudinal cam track mounted to the seat bottom frame; and
a cam follower mounted to the transverse shaft cooperating with the longitudinal cam track for adjusting a rotational orientation of the cam follower, transverse shaft and the seat back as the carriage translates.

14. The seat assembly of claim 12 wherein the transverse shaft is mounted to the carriage by at least one rotary bearing.

15. The seat assembly of claim 12 wherein the seat back includes a pair of brackets extending to opposed lateral sides of the seat bottom frame, each bracket being fixed to a distal end of the transverse shaft.

16. The seat assembly of claim 12 further comprising a secondary transmission in geared engagement with the transverse shaft for adjusting a tilt position of the seat back.

17. The seat assembly of claim 16 further comprising a gear mounted to the transverse shaft in geared engagement with and driven by the secondary transmission.

18. The seat assembly of claim 17 wherein the transverse shaft gear is further defined as a sector gear.

19. A method for adjusting a seating assembly for multiple seating positions comprising:
translating a seat back by a motorized transmission from an aft position wherein a passenger may sit on a seat bottom and face a first direction, to a fore position relative to the seat bottom wherein the passenger may sit on the seat bottom and face a second direction; and
pivoting the seat back from a first tilt angle in the aft position to a second tilt angle in the fore position as a function of translation from the aft position to the fore position.

* * * * *